United States Patent
Braedt et al.

(10) Patent No.: US 11,572,134 B2
(45) Date of Patent: Feb. 7, 2023

(54) CYCLE DERAILLEUR WITH SETTING INDICATOR

(71) Applicant: SRAM DEUTSCHLAND GmbH, Schweinfurt (DE)

(72) Inventors: Henrik Braedt, Hambach (DE); Sebastian Heyna, Hambach (DE)

(73) Assignee: SRAM Deutschland GmbH, Schweinfurt (DE)

(*) Notice: Subject to any disclaimer, the term of this patent is extended or adjusted under 35 U.S.C. 154(b) by 243 days.

(21) Appl. No.: 16/998,667

(22) Filed: Aug. 20, 2020

(65) Prior Publication Data

US 2021/0054929 A1   Feb. 25, 2021

(30) Foreign Application Priority Data

Aug. 23, 2019 (DE) .................. 10 2019 005 942.5
Aug. 14, 2020 (DE) .................. 10 2020 210 354.2

(51) Int. Cl.
| | | |
|---|---|---|
| *B62M 9/121* | (2010.01) | |
| *B62M 9/1242* | (2010.01) | |
| *B62M 9/125* | (2010.01) | |
| *B62M 9/124* | (2010.01) | |

(52) U.S. Cl.
CPC ............ *B62M 9/121* (2013.01); *B62M 9/124* (2013.01); *B62M 9/125* (2013.01); *B62M 9/1242* (2013.01); *B62M 2009/12406* (2013.01)

(58) Field of Classification Search
CPC ...... B62M 9/121; B62M 9/122; B62M 9/123; B62M 9/124; B62M 9/1242; B62M 9/1244; B62M 9/125; B62M 9/126; B62M 2009/12406; B62M 2009/12413; B62M 9/131; B62M 9/132; B62M 9/133; B62M 9/134; B62M 9/13442; B62M 9/135; B62M 9/136; B62M 6/50; B62J 45/00; B62J 45/41; B62J 45/413; B62J 45/42

See application file for complete search history.

(56) References Cited

U.S. PATENT DOCUMENTS

| | | | | |
|---|---|---|---|---|
| 4,362,523 A * | 12/1982 | Huret | .................. | B62M 9/1246 474/82 |
| 6,162,140 A * | 12/2000 | Fukuda | .................. | B62M 25/08 474/81 |
| 6,350,212 B1 * | 2/2002 | Campagnolo | .......... | B62M 9/126 474/82 |

(Continued)

FOREIGN PATENT DOCUMENTS

| | | | | |
|---|---|---|---|---|
| CN | 108502090 A * | 9/2018 | ............ | B62M 9/122 |
| DE | 202016001048 | 3/2016 | | |
| EP | 3388324 | 10/2018 | | |

*Primary Examiner* — Michael R Mansen
*Assistant Examiner* — Raveen J Dias (57) ABSTRACT

The disclosure relates to a derailleur for a bicycle, comprising a B-knuckle assembly which is designed for mounting on the bicycle frame, a P-knuckle assembly, a parallelogram assembly via which the B-knuckle assembly and the P-knuckle assembly are movably connected to one another, a cage assembly in which a chain guide pulley and a chain tension pulley are rotatably held, where the cage assembly is mounted on the P-knuckle assembly so as to be rotatable about a P axis, and an rotation angle detection device which is designed to detect and/or display an angle of rotation between the P-knuckle assembly and the cage assembly.

8 Claims, 8 Drawing Sheets

(56) References Cited

U.S. PATENT DOCUMENTS

| | | | |
|---|---|---|---|
| 6,623,389 B1* | 9/2003 | Campagnolo | B62M 25/08 474/70 |
| 7,572,199 B1* | 8/2009 | Calendrille, Jr. | B62M 9/125 474/82 |
| 8,137,223 B2* | 3/2012 | Watarai | B62K 23/06 474/81 |
| 8,678,964 B2* | 3/2014 | Lin | B62M 9/124 474/80 |
| 9,120,530 B2* | 9/2015 | Yamaguchi | B62M 9/126 |
| 9,463,846 B1* | 10/2016 | Chang | B62M 9/1248 |
| 9,944,350 B2* | 4/2018 | Braedt | B62M 9/124 |
| 10,668,985 B2* | 6/2020 | Miglioranza | B62M 9/132 |
| 10,780,946 B2* | 9/2020 | Braedt | B62J 45/42 |
| 10,793,222 B1* | 10/2020 | Harris | B62M 9/1242 |
| 11,230,350 B2* | 1/2022 | Braedt | B62M 9/125 |
| 2001/0048211 A1* | 12/2001 | Campagnolo | B62M 9/126 280/210 |
| 2009/0098963 A1* | 4/2009 | Watarai | B62K 23/06 474/80 |
| 2013/0130853 A1* | 5/2013 | Bohm | B62M 9/124 474/80 |
| 2013/0281237 A1* | 10/2013 | Lin | B62M 9/124 474/80 |
| 2013/0303317 A1* | 11/2013 | Yamaguchi | B62M 9/126 474/80 |
| 2014/0162817 A1* | 6/2014 | Yamaguchi | B62M 9/122 474/80 |
| 2014/0162818 A1* | 6/2014 | Yamaguchi | F16H 61/68 474/80 |
| 2014/0213397 A1* | 7/2014 | Yamaguchi | B62K 23/04 474/80 |
| 2014/0296009 A1* | 10/2014 | Suyama | B62M 9/122 474/80 |
| 2016/0152301 A1* | 6/2016 | Bortoli | B62M 9/132 474/82 |
| 2016/0288877 A1* | 10/2016 | Goates | B62M 9/122 |
| 2017/0197685 A1* | 7/2017 | Braedt | B62M 9/122 |
| 2018/0178881 A1* | 6/2018 | Miglioranza | B62M 9/122 |
| 2018/0194432 A1* | 7/2018 | Braedt | B62J 45/42 |
| 2018/0208269 A1* | 7/2018 | Nose | B62M 25/08 |
| 2019/0016412 A1 | 1/2019 | Emura et al. | |
| 2019/0300110 A1* | 10/2019 | Takayama | B62M 9/122 |
| 2020/0361565 A1* | 11/2020 | Komatsu | B62M 25/08 |

* cited by examiner

CYCLE DERAILLEUR WITH SETTING INDICATOR

PRIORITY

This application claims priority to, and/or the benefit of, German patent application DE 10 2019 005 942.5, filed on Aug. 23, 2019 and DE 10 2020 210 354.2, filed on Aug. 14, 2020, the contents of both DE 10 2019 005 942.5 and DE 10 2020 210 354.2 are included by reference herein in their entirety.

BACKGROUND

Single drives (with only one chainwheel) having widely spread sprocket cassettes (with a gear spread of the cassette between the highest and the lowest transmission ratio of for example 400% or more) have become prevalent in recent years on higher-grade mountain bikes.

Inter alia, in order to keep operating forces low when shifting between the different transmission ratios of the cassette, derailleurs having a parallelogram which is not slanted or is slanted only to a small degree are primarily installed in combination with such cassettes. Such derailleurs are known for example from documents DE 20 2016 001 048 U1 or EP 3 388 324 A3 (EP'324).

Figure 3:
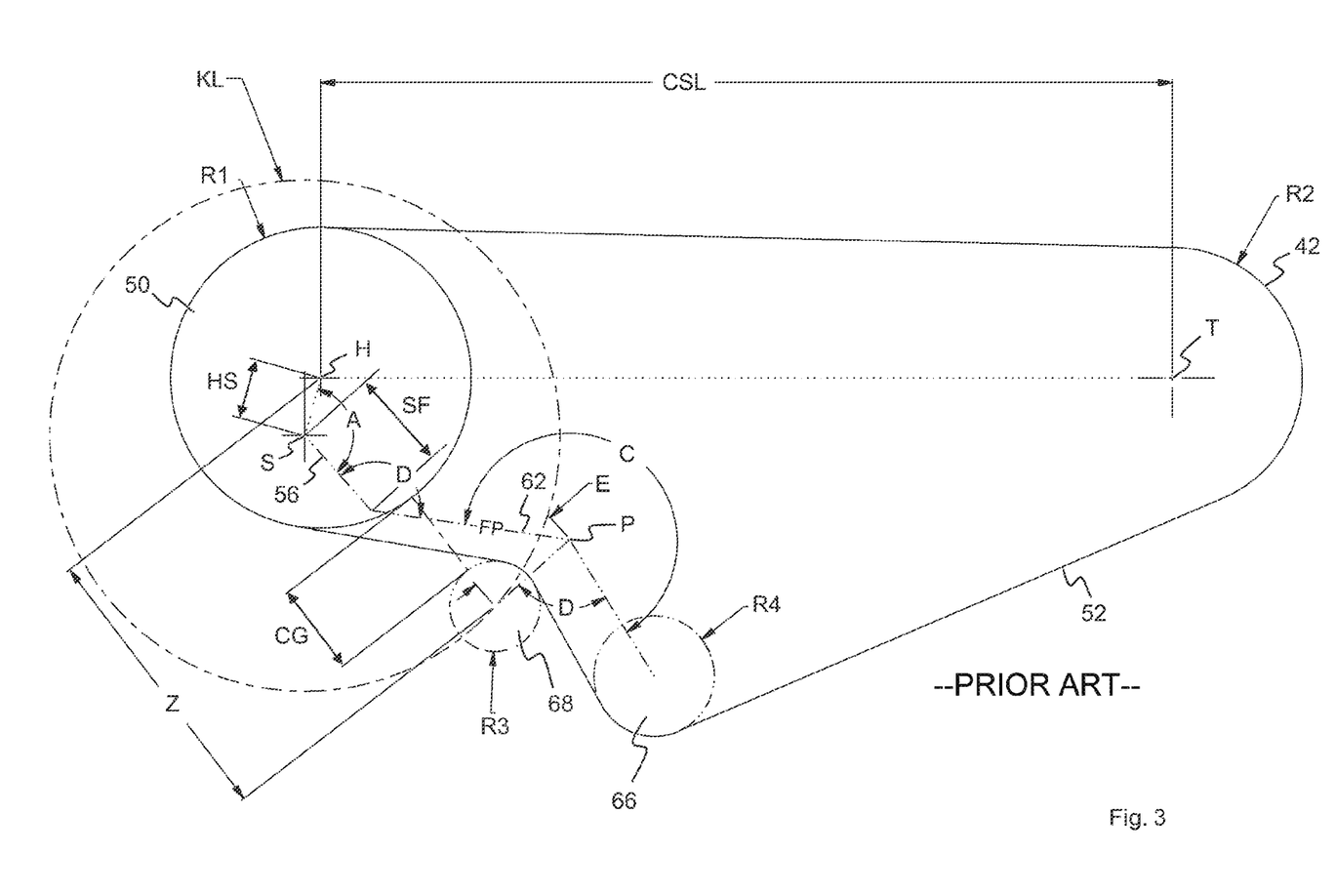
FIG. 3 shows a functional view of a conventional rear derailleur, mounted eccentrically with respect to the rear axle.

In order, in all the different transmission ratios, to maintain a suitable chain gap CG (distance between the upper chain guide pulley and reference sprocket, cf. FIG. 3 or EP'324, paragraphs [0088] to [0095] and FIGS. 10 to 12, also referred to as B gap), it is the case in such derailleurs that the distance between the upper chain guide pulley 68 of the derailleur and the pivot axis P (cf. FIG. 3) of the P-knuckle is considerably increased by comparison with conventional derailleurs having a slanted parallelogram.

A consequence thereof is that the chain gap CG in such derailleurs is more dependent on the chain length and on other factors, such as inter alia on any frame suspension kinematics with so called chainstay growth (change in the distance CSL, cf. FIGS. 3 and 4, between the bottom bracket shaft T and rear wheel axis H during spring compression) or with so called sag position (negative spring travel) and on the chain wear occurring over time. As a result, the drivetrain in such derailleurs having a parallelogram which is not slanted or is slanted to a small degree is overall considerably more sensitive to the setting carried out on the chain gap CG or on the actual size thereof than with conventional rear derailleurs with a slanted parallelogram.

Particularly in the case of the aforementioned derailleurs with a parallelogram with little or no slant, the chain gap plays a central role in the setting of the shifting system. It is crucially responsible for the fact that the shaped elements for shifting and deflecting functions on the sprockets of the sprocket cassette can be correctly used, that thus the chain shifts exactly at the rotation positions provided therefore on the cassette, and that overall no structural parts of the system are damaged by poor shifting quality or collisions.

SUMMARY

According to one aspect, a derailleur for a bicycle includes a B-knuckle assembly configured to be mounted on a bicycle frame; a P-knuckle assembly; a parallelogram assembly via which the B-knuckle assembly and the P-knuckle assembly are movably connected to one another; a cage assembly in which a chain guide pulley and a chain tension pulley are rotatably held, the cage assembly is mounted on the P-knuckle assembly so as to be rotatable about a P axis; and a rotation angle detection device configured to at least one of detect and display an angle of rotation between the P-knuckle assembly and the cage assembly.

BRIEF DESCRIPTION OF DRAWINGS

Other aspects and advantages of the embodiments disclosed herein will become apparent upon consideration of the following detailed description, wherein similar or identical structures have similar reference numerals.

DETAILED DESCRIPTION

To set the chain gap CG, a derailleur usually is fastened to the derailleur hanger or bicycle frame so as to be rotatable (angle of rotation A in FIGS. 3 and 4) about a pivot axis, hereinafter also referred to as B axis (cf. for example FIG. 1 in EP'324). This pivot axis S can be arranged concentrically to (cf. FIG. 2a and FIG. 4 and the teaching of EP'324) or displaced parallel to the sprocket axis (rear wheel axis H) (cf. FIG. 3).

The chain gap CG, or the distance of the chain guide pulley 68 (upper pulley in the chain cage) or of the chain cage from a cassette sprocket (reference sprocket), can be set by the rotation of the B-knuckle 56 (cf. FIGS. 3 and 4, also known as "base element", cf. FIGS. 2a, 2b and EP'324, paragraphs [0002] and [0012] and FIGS. 1 and 3 of EP'324 and associated description of the figures) and thus of the entire derailleur by the angle of rotation A relative to the dropout of the bicycle frame. In particular, the following aids are known for this setting of the chain gap CG required for an optimum function of the drivetrain: measuring means (caliper, ruler); setting gauge (cf. DE 20 2016 001 048 U1); marking on the derailleur outer cage (cf. US20190016412A1).

In the case of each of these aids, the derailleur setting is carried out on the basis of a direct distance measurement of the chain gap (or by corresponding gauging by a setting gauge or by marking) between the derailleur and cassette sprocket. As a rule, the largest or second largest cassette sprocket is used here as reference sprocket.

The chain length required for the correct operation of the drivetrain differs in each case for different bicycles having chainstay lengths CSL differing from one another and/or having different numbers of teeth on the cassette and chainring. In the case of full-suspension bicycles, the chainstay length is additionally influenced by the spring compression movements already mentioned at the outset.

However, on account of the fixed pitch dimension of the chain links and on account of the alternating arrangement of inner link plates and outer link plates of the chain, the chain length and thus the chain gap can in principle only be adapted in relatively coarse steps corresponding to double the chain pitch dimension. Therefore, in order to finely set the chain gap, the angle A between the derailleur and frame dropout is customarily changed.

Known disadvantages of traditional chain gap setting:

1. In derailleurs having an axis of rotation displaced parallel to the sprocket axis (cf. FIG. 3), setting the chain gap CG based on the different boundary conditions (chainstay length, numbers of teeth on the chainring and cassette, distance of the derailleur hanger from the rear axis and angle to the chainstay and also size and arrangement of the components of the derailleur, etc.) gives rise to different resulting angles C with the chain gap being the same size in each case. Therefore, as stated above, the chain gap must be measured/checked directly between the derailleur and cassette. In principle, it may not be possible in these derailleurs for a generally ideal angle C to be found for different bicycles.

2. In derailleurs having a concentric arrangement of the sprocket axis and derailleur axis of rotation (cf. FIG. 4 and EP'324), the angle C remains substantially constant even if the angle A varies when setting the chain gap to the aforementioned boundary conditions (chainstay length, numbers of teeth on the chainring and cassette, etc.), since in the case of such concentrically mounted derailleurs the chain gap is geometrically dependent only on the angle C, but not on the angle A. It is therefore possible in this case to dispense with a direct measurement/gauging of the chain gap, and the size of the chain gap for a respective reference gear can instead be checked directly on the derailleur (by determining only the angle C). The existing, but small influence of the axial position of the derailleur (shifting position or engaged gear) on the chain gap with the reference gear correctly selected, in particular in the case of derailleurs having a parallelogram which is straight or slanted to a small degree, is negligible here.

Document EP'324 has already described a solution in which, for setting the chain gap, the angle C is defined by a setting lock situated on the derailleur (cf. paragraphs [0088] to and FIGS. 2, 3 and 10 of EP'324). A disadvantage with this setting variant is that, depending on the mode of construction, it can be difficult for the user to produce the form-fitting connection, which is required when setting, between the shaped elements of the locking device, since these elements can be visually concealed from the usual direction of view of the operator by structural parts of the derailleur. This can lead to an unsatisfactory use of this function in that the angle is not determined or is incorrectly determined by the user. Furthermore, it is not possible for the user alone to check the quality of the setting in the riding position—rider sitting on the bicycle, rear triangle possibly under a spring compression. In addition, the adaptability of the prior solution is not very flexible, since additional structural parts are required for the setting lock, or the arrangement of present structural parts is negatively influenced.

Against the background described above, it was an object of the present disclosure to detect a chain gap more reliably and more conveniently in a derailleur and to simplify a setting of the chain gap in this way.

According to the present disclosure, this object is achieved by a derailleur for a bicycle, comprising a B-knuckle assembly which is configured to be mounted on a bicycle frame or on a derailleur hanger, a P-knuckle assembly, a parallelogram assembly via which the B-knuckle assembly and the P-knuckle assembly are movably connected to one another, a cage assembly in which a chain guide pulley and a chain tension pulley are rotatably held, where the cage assembly is mounted on the P-knuckle assembly so as to be rotatable about a P axis, and an indicator device, or angle of rotation detection device, respectively, which is designed to indicate or display, respectively, an angle of rotation between the P-knuckle assembly and cage assembly.

According to an important feature of the disclosure, an angle of rotation between the P-knuckle assembly and the cage assembly is accordingly detected and indicated as a measure for the chain gap. Such an indicator device can be of simple construction and be conveniently read by the user, with the result that the chain gap can be conveniently checked. This also assists the setting of a correct chain gap during the assembly or maintenance of the derailleur.

Figure 6:
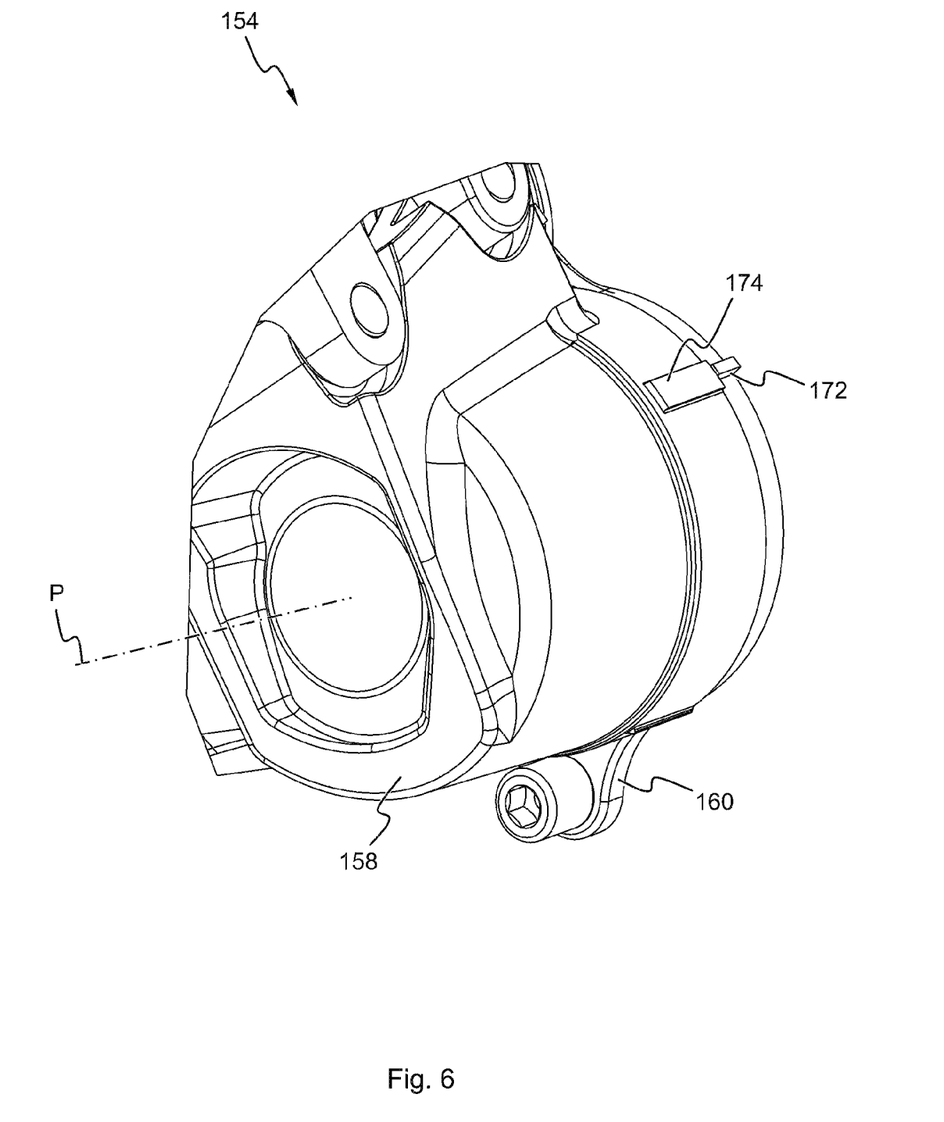
FIG. 6 shows a perspective view of an angle of rotation indicating device of the derailleur of the exemplary embodiment, according to a third variant of the disclosure.
Figure 7:
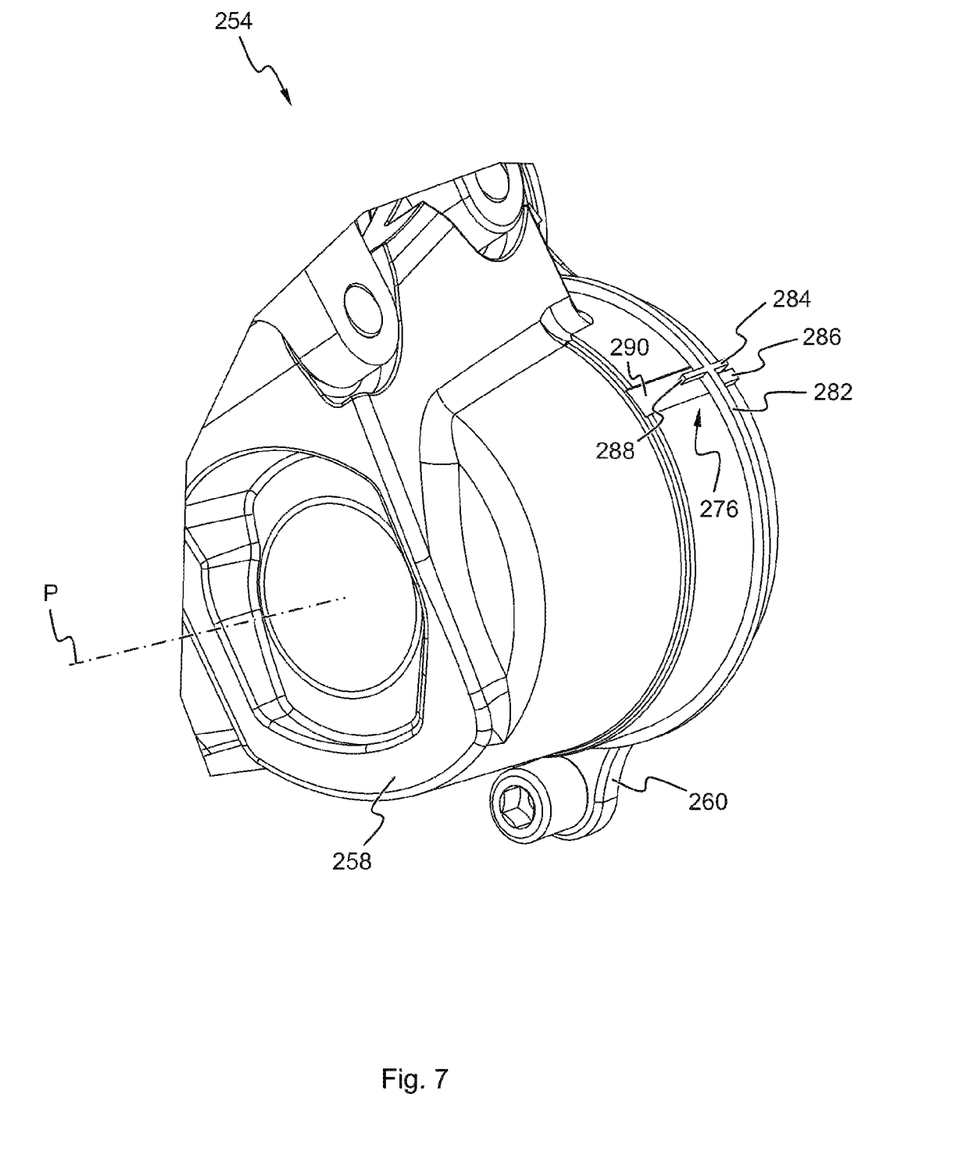
FIG. 7 shows a perspective view of an angle of rotation indicating device of the derailleur of the exemplary embodiment, according to a fourth variant of the disclosure.

For the purpose of the present disclosure, "angle of rotation" also shall include, in particular, a range of an angle of rotation, as can also be seen from the embodiments e.g. according to FIGS. 6 and 7 and the associated description, since a certain target range for the angle of rotation and thus also a certain target range for the intended chain gap will be prescribed and/or permitted by the manufacturer for the drive train of the bicycle.

According to an advantageous embodiment, the indicator device can have at least a first marking which is provided on the P-knuckle assembly or/and on the cage assembly. In this way, the relative movement between the P-knuckle assembly and cage assembly can be directly used to realize the indicator. In particular, the indicator device can have a first marking which is provided on the P-knuckle assembly, and have a second marking which is provided on the cage assembly. The markings can then be provided correspondingly close together, with the result that in particular a predetermined orientation of the two markings with respect to one another can indicate a correct chain gap.

The first or second marking can be realized by various variants, for example by a sticker, an imprint, a shaped element (an elevation or a depression, etc.), a marking produced by a laser, a change in colour of material or an additionally mounted structural part. Such markings can be mounted in a simple and reliable manner and can, where appropriate, also be retrofitted. At the same time, they are cost-effective and manage in particular without electronics, special sensor technology or movable structural parts.

In a further preferred embodiment, the indicator device can have a drag pointer which indicates a maximum angle of rotation between the P-knuckle assembly and the cage assembly. This is particularly advantageous if the angle of rotation changes during a use of the derailleur, for example during riding. The drag pointer can be rotatably mounted on the P-knuckle assembly, and the cage assembly can have a projection which is configured to carry along the drag pointer during a rotational movement of the cage assembly about the P axis.

Alternatively, the drag pointer may be supported on the cage assembly, and a projection for driving the drag pointer may be located on the P knuckle assembly.

In a simple mechanical realization of a drag pointer, there can be provision that the drag pointer is mounted on one of the two assemblies consisting of the P-knuckle assembly and cage assembly by a friction bearing with a predetermined friction force being rotatable about the P axis, and that the other of the two structural parts has a driving element, in particular the projection, which is configured to carry along the drag pointer during a rotational movement between the cage assembly and P-knuckle assembly.

In order to ensure that the drag pointer occupies little installation space and does not jam during its movement, the drag pointer can be configured as a ring which is concentric to the P axis.

In a further preferred embodiment, the indicator device, or angle of rotation detection device, respectively, can include: an angle sensor for detecting an angle value, which indicates the angle of rotation between the P-knuckle assembly and cage assembly, and a transmitting device which is configured to transfer detection information dependent on the angle value to a receiving device. The detection information may be transmitted wirelessly (especially by radio) or by a wire. An angle of rotation detection device equipped with an angle sensor and transmitting device has the advantage that information on the angle of rotation and thus on the chain gap can be transmitted to an indicator interface which is readily accessible to the user, with the result that the chain gap can be monitored even more conveniently by the user. For example, the transmitting device can transmit the detection information to a mobile terminal (Smartphone, bicycle computer, etc.), or to a HMI (Human Machine Interface) located on the bicycle, for example on the handlebars or on the frame.

In a further preferred embodiment, the indicator device, or angle of rotation detection device, respectively, can further include: an angle sensor for detecting an angle value, which indicates the angle of rotation between the P-knuckle assembly and cage assembly, and an electric indicator means which is configured as an electronic display or as a light source, in particular an LED, and which is configured to indicate detection information dependent on the angle value. An electric indicator means offers good readability and a high degree of flexibility with respect to the configuration of the reproduced information. It is thus possible, in particular by differently coloured light sources, for information with respect to the chain gap to be output in a very reliable and intuitive manner.

The indicator device according to the disclosure demonstrates particular advantages in a derailleur in which the B-knuckle assembly is configured to be mounted on a bicycle frame or on a derailleur hanger so as to be pivotable about a B axis, where the B axis runs coaxially to a rear wheel axis of a bicycle.

As already indicated, the monitoring or setting of the chain gap relates to a predetermined reference sprocket, such as the setting of the derailleur into a predetermined reference gear. Accordingly, in a further preferred embodiment, the derailleur can include a reference gear detection device which is configured to detect or/and indicate whether the derailleur is or is not set into a predetermined reference shifting stage.

In a structurally simple, but reliable manner, a reference gear detection device of the aforementioned type can be realized by virtue of the fact that it is configured to detect or/and indicate information concerning a relative position between at least two assemblies consisting of the bicycle frame, B-knuckle assembly, parallelogram assembly, P-knuckle assembly and cage assembly. The function of such a reference gear detection device can be attributed to the fact that the above-specified assemblies each move relative to one another substantially in a direction parallel to the rear wheel axle during an adjustment of the shifting stages, with the result that the relative position of at least two of these assemblies with respect to one another at a specified time can provide information on a set gear stage.

In a simple variant of the disclosure, a reference gear detection device can have a marking of the aforementioned type, for example a sticker, an imprint, a shaped element, a marking produced by a laser, a change in colour of material, or an additionally mounted structural part, or/and the reference gear detection device can have an angle sensor or an LED indicator. Alternatively or additionally, the reference gear detection device can generate a signal which indicates whether the derailleur is or is not set into a predetermined reference shifting stage, and the signal can be indicated by an electronic indicator means or/and transmitted wirelessly or by cable to an indicator device. In particular, the transmission to the indicator device can then advantageously be used to make the indication of the chain gap or of a detection value representing the chain gap dependent on whether the reference gear is engaged or not. In general, a correct indication or setting of the chain gap is possible only when setting the reference gear.

Figure 1:
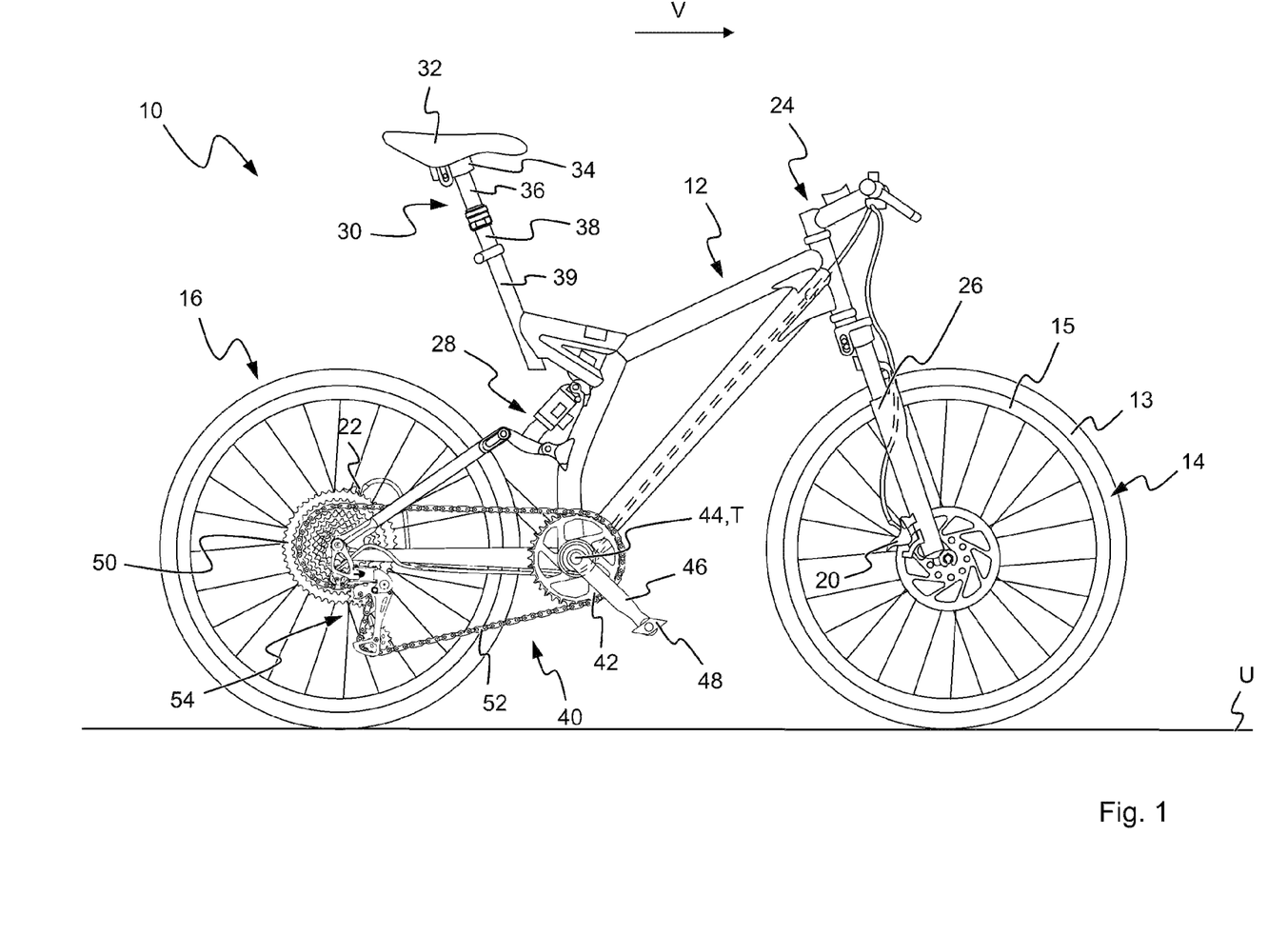
FIG. 1 shows a side view of a bicycle on which a derailleur according to the exemplary embodiment of the present disclosure is mounted.

The disclosure will be explained in more detail below on the basis of a preferred embodiment and by preferred variants of the embodiment, with reference to the appended drawings, in which:

FIG. 1 illustrates a bicycle 10 of the mountain bike type which has a frame 12 and a front wheel 14 and a rear wheel 16 which are rotatably mounted on the frame 12. The bicycle 10 can have a front wheel brake 20 for braking the front wheel 14 and a rear wheel brake 22 for braking the rear wheel 16. The front and rear wheels 14, 16 can each bear tires 13 which are fitted onto a rim 15, where the tires 13 are configured to roll on a roadway U. A handlebar arrangement 24 is provided for steering the front wheel 14. An arrow V indicates a forward direction or direction of travel of the bicycle 10 along the roadway U.

The front wheel 14 can be connected to the frame 12 via a front wheel suspension or suspension fork 26. The rear wheel 16 can be connected to the frame via a rear wheel suspension 28. The rear wheel suspension 28 can include a combination of springs, dampers or/and joints in order to allow a spring movement of the rear wheel relative to the frame in a manner known per se. The bicycle 10 can also have a settable seat assembly 30 in order to allow the seat position to be set. The seat assembly 30 can include a saddle 32 which is mounted on an upper seat post 36 via a seat post head 34. The upper seat post 36 can be movable with respect to a lower seat post 38 which is fastened to a seat tube 39 of the frame 12.

A drive arrangement 40 of the bicycle 10 preferably includes a front chainring 42 which is mounted on a bottom bracket 44 so as to be rotatable on the frame 12 about a bottom bracket axis T and is driven to rotate by the user in a manner known per se by cranks 46 and pedals 48, a sprocket cluster 50 which is fastened to the rear wheel 16 coaxially to a rear wheel axis H of the rear wheel 16, and a plurality of sprockets with different numbers of teeth, and also a chain 52 which runs around the chainwheel 42 and the sprocket cluster 50 in order to transmit driving force from the chainwheel 42 to the sprocket cluster 50.

Figure 2A:
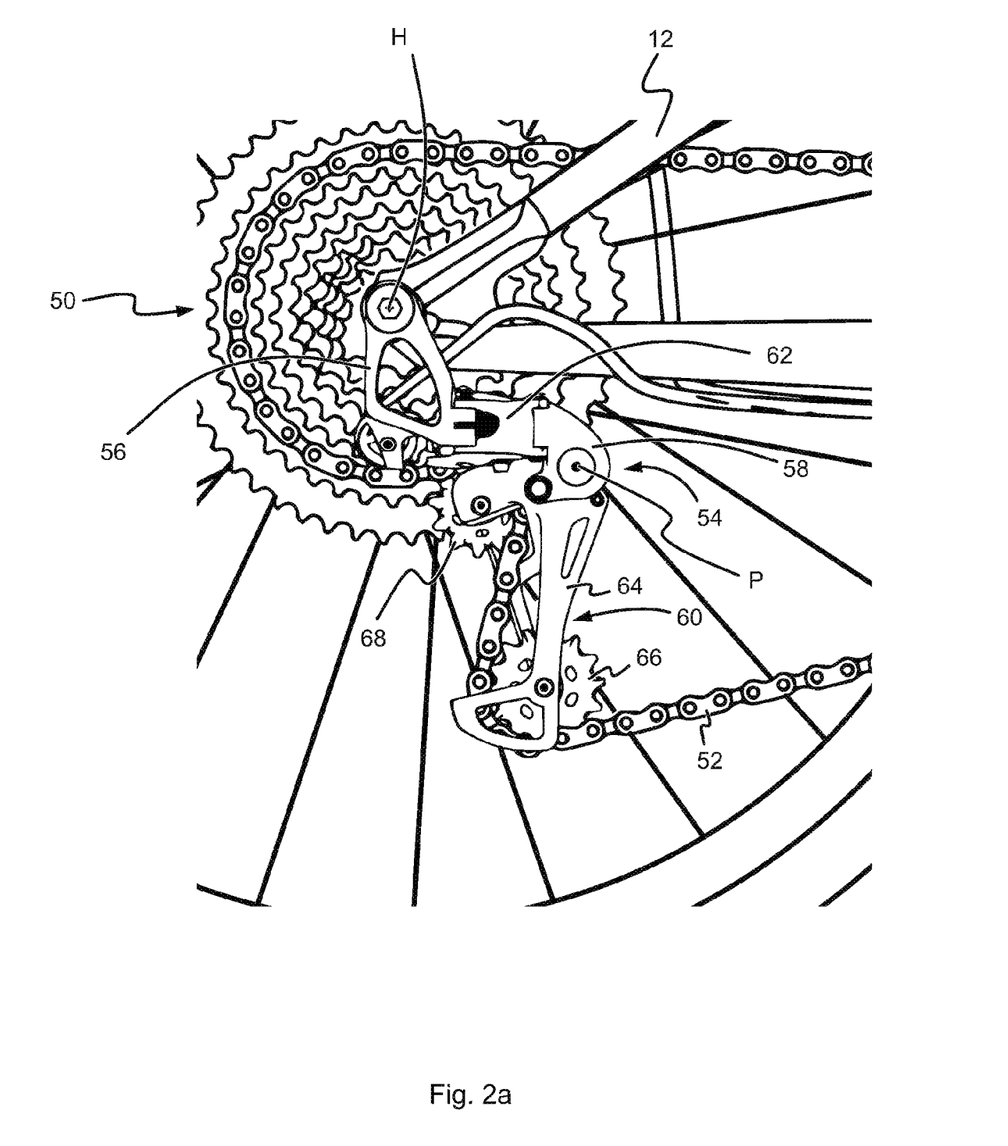
FIG. 2a shows an enlargement of a detail from FIG. 1 in the region of the derailleur.
Figure 2B:
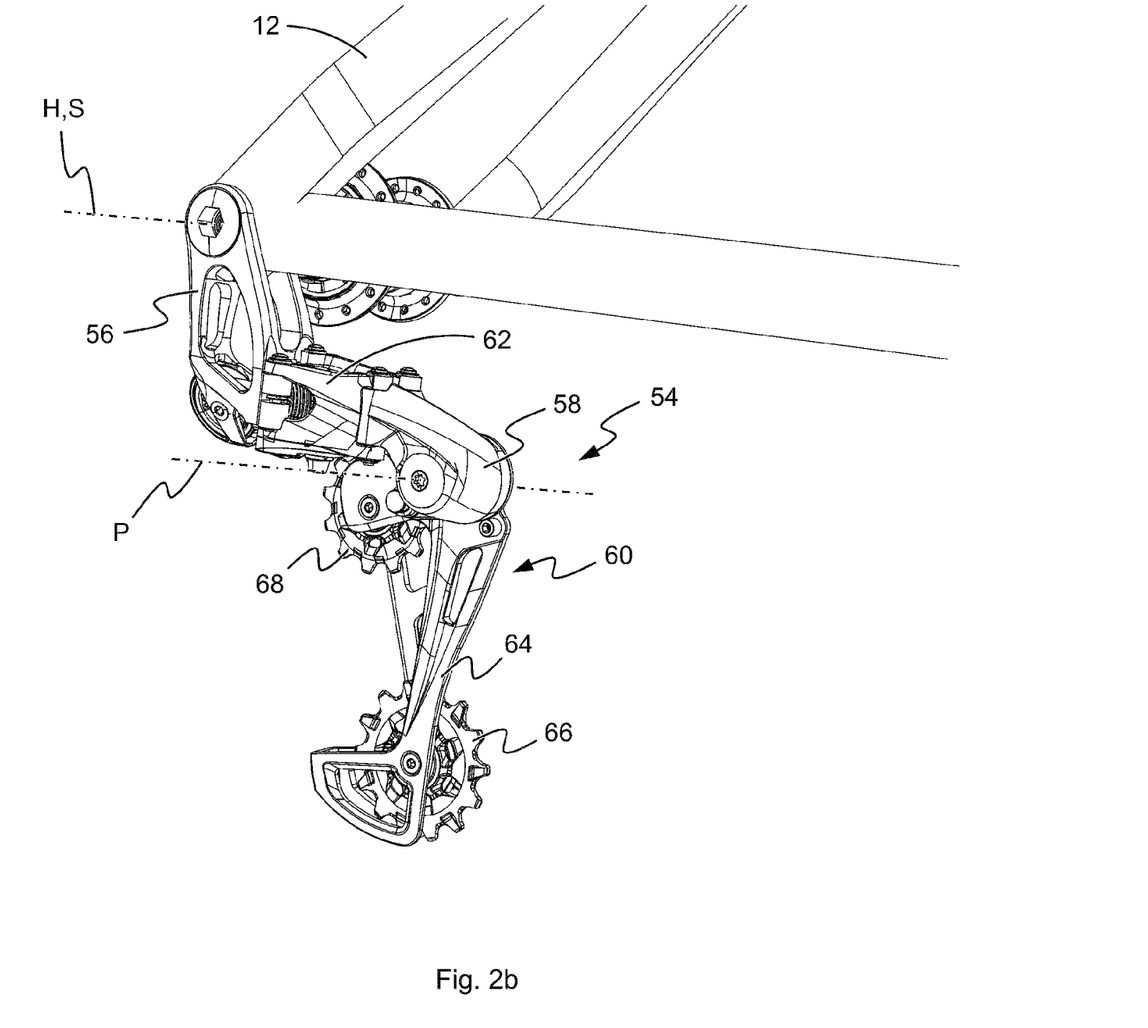
FIG. 2b shows a perspective view of a rear derailleur mounted coaxially to the rear axle, similar to FIGS. 1 and 2a, and similar to FIG. 1 of EP'324.

In order to shift the chain 52 between the different sprockets of the sprocket cluster 50, there is provided a rear derailleur 54 which will be explained in more detail below with reference to FIG. 2a and FIG. 2b. The derailleur 54 includes a B-knuckle assembly 56 which is rotatably mounted on a rear end of the frame 12. A B-axis S about which the B-knuckle assembly 56 is rotatably held on the frame 12 runs along concentrically to the rear wheel axis H, which corresponds to FIG. 4.

The derailleur 54 further includes a P-knuckle assembly 58 on which a cage assembly 60 is held so as to be pivotable about a P axis. The P axis preferably runs parallel to and at a distance from the B axis S. The B-knuckle assembly 56 and P-knuckle assembly 58 are movably connected to one another by a parallelogram assembly 62, where the P-knuckle assembly 58 is preferably displaced substantially along the axial direction of the rear axle relative to the B-knuckle assembly 56 during this movement. This movement is controlled by the user via a shift cable or by electrical, optionally wireless activation when the derailleur 54 is actuated to set different shifting stages.

The cage assembly 60 includes a cage 64 in which a chain tension pulley 66 and a chain guide pulley 68 are each held so as to be rotatable about axes parallel to the P axis. The chain 52 runs around the front chain wheel 42, the chain tension pulley 66, the chain guide pulley 68 and finally a sprocket of the sprocket cluster 50. During actuation of the derailleur 54, the cage assembly 60 is moved in the above-described manner substantially in a direction parallel to the rear wheel axis H, with the result that the chain 52 is guided via the chain guide pulley 68 onto a correspondingly aligned sprocket of the sprocket cluster 50, and in this way a desired shifting stage is set.

According to the disclosure, the derailleur 54 is equipped with an angle of rotation detecting/indicating device (not shown in FIGS. 1 to 2b) by which an angle of rotation C between the P-knuckle assembly 58 and the cage assembly 60 can be detected and indicated. Embodiments of such an indicator device are explained in more detail below with reference to the embodiments of FIGS. 5, 6 and 7.

Figure 5:
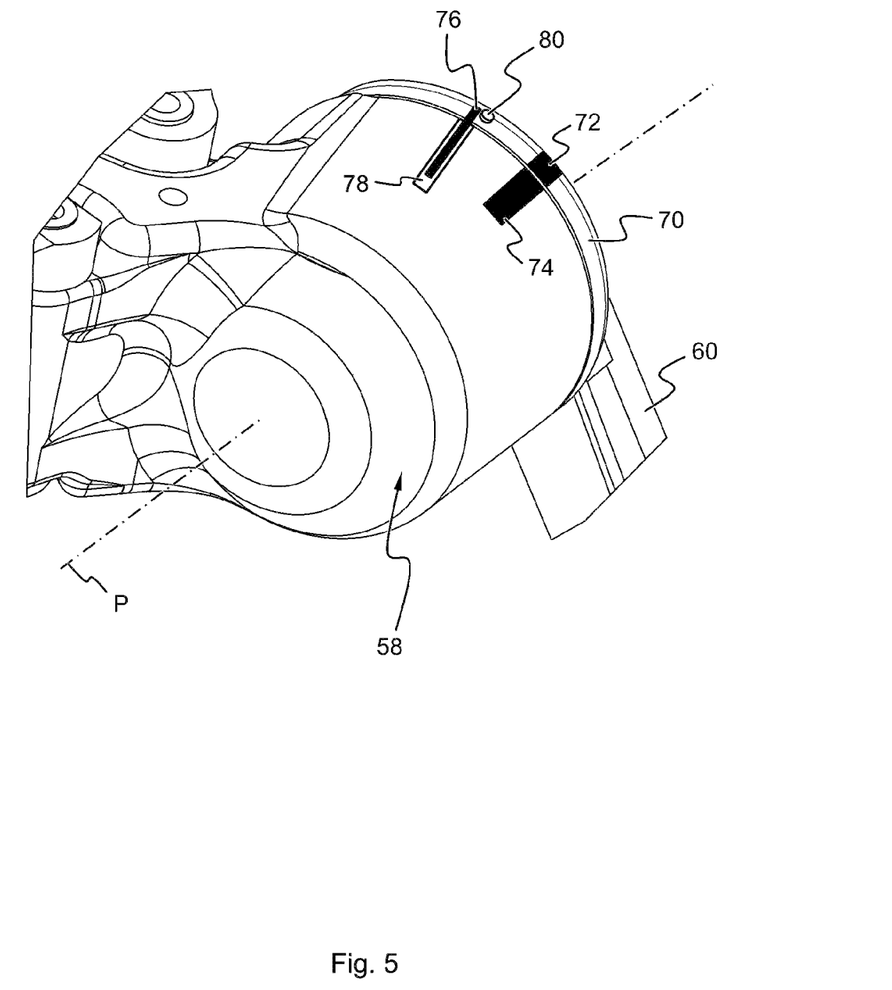
FIG. 5 shows a perspective view of two different angles of rotation indicating devices of the derailleur of the exemplary embodiment, according to a first or a second variant of the disclosure.

The novel solution approach shown in FIG. 5 is realized by way of an angle of rotation indicator (provided alternatively or additionally to the aforementioned aids such as gauge or marking) on the P-knuckle assembly 58 and the cage assembly 60.

For this marking or angle indicator, the following embodiment variants are possible inter alia: sticker; imprint; shaped element (positive/negative), for example including bores; marking produced by laser; change in colour of the material; additional mounted structural parts (for example integrated in a cover); angle sensor, for example electronic; and LED indicator.

As shown in FIG. 5, the cage assembly 60, according to a first variant, can have a corotating intermediate structural part 70 which bears a first marking 72. A second marking 74 can be arranged on the P-knuckle assembly 58. The first marking 72 and second marking 74 can be configured such that they are aligned with one another with correct chain gap CG.

According to a second variant, the indicator can (alternatively or additionally) also be realized in such a way that a pointer in the sense of a drag pointer 76, which is mounted for example on the P-knuckle assembly 58, is provided which indicates the maximum angle C which has been achieved (for example with the rider seated and the sag position of the rear triangle suspension correspondingly achieved, or during riding operation). One or more markings are required on the cage assembly 60 or P-knuckle assembly 58 for this purpose in addition to the co-running drag pointer 76, by which markings the position reached by the drag pointer 76 can be read and evaluated, for example a target marking 78, which is arranged on the P-knuckle assembly 58, for the drag pointer 76 with correct setting of the chain gap CG. During a rotational movement of the cage assembly 60 relative to the P-knuckle assembly 58, the drag pointer can be carried along by a projection 80 which is provided for example on the intermediate structural part 70 of the cage assembly 60.

A given single sprocket (reference sprocket) is selected as reference sprocket for each chain gap setting, since the chain gaps on sprockets of different sizes differ from the setpoint value set on the reference sprocket as a result of different structural part combinations and geometries (bicycle frame, transmission ratio, numbers of teeth on the sprocket cluster and chainring, chain length, etc., as mentioned above). It is only with the chain on the provided reference sprocket that the chain gap corresponds exactly to the desired dimension, and correspondingly it is only on this sprocket that the relationship between the angle C and the chain gap CG is determined to the desired value. However, it can be advantageous to select different reference sprockets, respectively, for bicycles with different frame geometries.

During setting in the assembly stand, without the negative spring travel being taken into consideration, it may be required to set another than the setpoint dimension for the chain gap in order to ensure that the desired chain gap results in the operating state with loaded suspension and thus upon achieving the negative spring travel. It is thus possible during assembly to compensate for the influence of the suspension system on the chain gap.

By virtue of the disclosure it is now possible for the correct value for the chain gap to be checked in a simple manner upon the rider being seated and looking at the markings 72, 74, 76, 78 on the P-knuckle assembly 58 and cage assembly 60. When using a drag pointer 76, it can also be checked after dismounting whether a correct value or range of values for the chain gap upon seating or during operation has been achieved (similar to the known displaceable O-rings on the suspension fork or frame damper).

If the system has once been correctly set, a subsequently occurring deviation of the chain gap from the setpoint, for example as a result of initial settling behaviour with respect to the rotation position between the derailleur and dropout, or as a result of chain wear, can be checked. After any settling behaviour has ended, it is thus furthermore also possible by to approximately determine the chain wear (for example by looking at the chain gap indicator of the derailleur, or else by an electronic remote indicator) and thus to indicate to the rider when a change of chain would be advisable. This indicator can additionally provide an indication that adjustment of the derailleur is required in that, for example, differently coloured indicator regions are provided for the value of the chain gap. Furthermore, it is possible by virtue of the disclosure to indicate to the rider whether the selected chain length is too long. In this case, the derailleur cage pivots far towards the rear, and the indicator as proposed above signals to the user that the chain is too long.

It is also possible, for example by a drag pointer 76, to check the maximum angle C which has occurred during riding, which can be an indicator as to whether the selected chain is too short or borderline short.

This can also occur by data transmission to a mobile device (mobile radio device, bicycle computer, navigation device, etc.) or to a component integrated on the bicycle (motor control elements, electronic indicators, etc.).

In order, for the setting of the chain gap, to signal the correct selection of the reference gear, it is possible for example for the B-knuckle assembly and derailleur cable spool to be provided with corresponding markings or with an angle indicator.

For this marking or angle indicator, the following embodiment variants are possible inter alia: sticker; imprint; shaped element (positive/negative), for example including bores; marking produced by laser; change in colour of the material; additional mounted structural parts (for example integrated in a cover); angle sensor, for example electronic; and LED indicator.

Alternatively, for the same purpose, elements of the parallelogram assembly and of the B-knuckle assembly can also be provided with corresponding markings or with an angle indicator. Further alternatively, it is possible in a similar manner to provide elements of the parallelogram assembly and P-knuckle assembly with corresponding markings or with an angle indicator for the correct selection of the reference gear.

Figure 4:
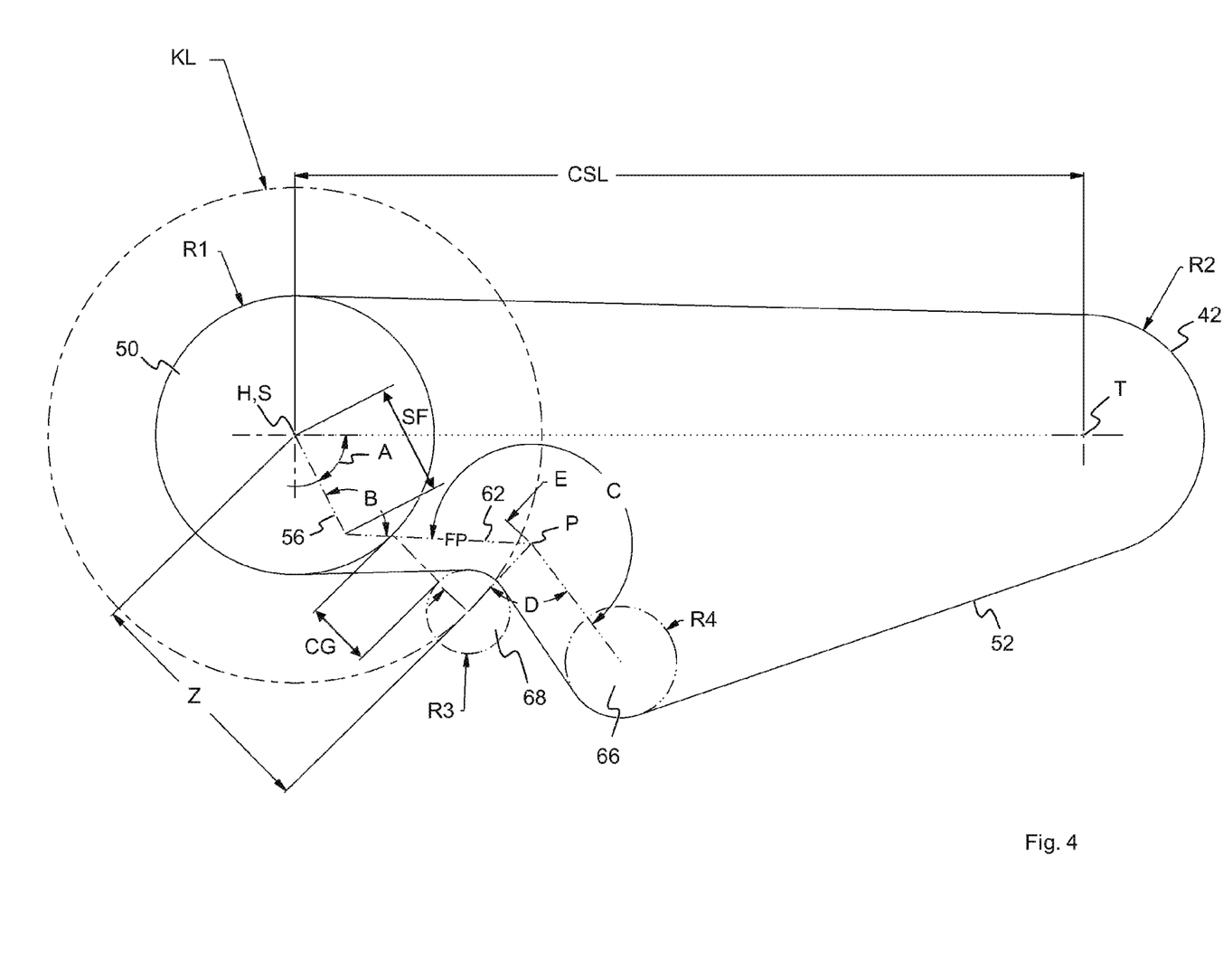
FIG. 4 shows a functional view of a bicycle drive train having a derailleur according to the exemplary embodiment of the disclosure.

Explanation of the reference signs used in FIGS. 3 and 4:

Dimension A: Angle between the B-knuckle assembly 56 and derailleur hanger/frame 12, adjustable for setting the chain gap CG. During derailleur assembly or after setting the chain gap CG, the angle A is fixed so as to be secured against rotation anticlockwise.

Dimension B: Angle between the parallelogram plane 62 and B-knuckle assembly 56, structurally determined.

Dimension C: Angle between the cage assembly 60 and assembly consisting of the P-knuckle assembly 58, B-knuckle assembly 56 and parallelogram assembly 62, which are mounted so as to be rotatable with respect to one another in the P-knuckle assembly 58.

Dimension D: Angle between the lines of connection of in each case the chain pulley axis and P-knuckle pivot axis P, structurally determined.

Dimension E: Distance between the chain guide pulley axis of the upper chain guide pulley 68 and the pivot axis P of the P-knuckle assembly 58.

Dimension Z: Distance between the sprocket axis H (rear wheel axis) and axis of the upper chain guide pulley 68. The relation of the chain guide pulley radius R3, sprocket radius R1 and distance Z gives the chain gap CG.

Dimension CSL: Distance between the axis of rotation H of the rear wheel and the axis of rotation T of the bottom bracket. Dimension CSL can vary as a result of spring compression movements (chainstay growth).

Dimension HS: Distance between the rear wheel axle H and the pivot axle S (B-axis) of the B-knuckle assembly 56.

Dimension SF: Length of the B-knuckle assembly 56.

Dimension FP: Length of the parallelogram assembly 62 (parallelogram length).

R1: pitch circle diameter of a reference sprocket; R2: pitch circle diameter of a chainring 42; R3: pitch circle diameter of the chain guide pulley 68 (upper pulley in the chain cage); R4: pitch circle diameter of the chain tension pulley 66 (lower pulley in the chain cage); and KL: movement curve of the axis of the chain guide pulley 68.

With reference to FIG. 6, an explanation is given below of a third variant of an angle of rotation detecting/indicating device which is provided for a derailleur according to the exemplary embodiment. The third variant is a modification of the first variant shown in FIG. 5 and described above. In what follows, only the differences over the first variant will be discussed in detail and otherwise reference is made to the above description. Identical or corresponding structural parts or components are designated by reference signs raised by 100.

A derailleur 154 according to the third variant includes a P-knuckle assembly 158 and a cage assembly 160 which is held thereon so as to be rotatable about a P axis. In the region of the rotary bearing on which the cage assembly 160 is mounted so as to be rotatable about the P axis on the P-knuckle assembly 158, the cage assembly 160 has a first marking 172 which can be configured as an elevation or indentation. In the illustrated exemplary embodiment, an elevation or a projection is arranged in a portion of the cage assembly 160 that is adjacent to the P-knuckle assembly 158. On the P-knuckle assembly 158 there is provided a second marking 174 which can likewise be configured as an indentation or elevation. In the variant according to FIG. 6, the second marking 174 is also provided as an elevation or projection at a position adjacent to the cage assembly 160.

The positions of the first marking 172 and second marking 174 in the circumferential direction with respect to the P axis are selected such that the angle C assumes a predetermined setpoint value or setpoint value range corresponding to the width of marker 174 in the circumferential direction (and hence the chain gap CG assumes a predetermined setpoint value or setpoint value range) if the two markings 172, 174 are oriented with respect to one another or are in alignment with one another or overlap.

The first and second markings 172, 174 are preferably arranged on a side of the P-knuckle assembly 158 or of the cage assembly 160 that points in the direction of travel, with the result that a rider can comfortably read the markings 172, 174 while riding or while the bicycle is stopped. The elevations of the markings 172, 174 can be provided in a single material with or integrally with the P-knuckle assembly 158 or cage assembly 160. Alternatively, they can be fastened as separate components to the surfaces of the P-knuckle assembly 158 and cage assembly 160.

With reference to FIG. 7, a description will be given below of a fourth variant of a derailleur according to the disclosure. The fourth variant is a modification of the second variant, with the result that in what follows only the differences over the second variant will be discussed in more detail and otherwise reference is made to the above description of the second variant. Identical or corresponding features or components are designated by reference signs raised by 200.

A derailleur 254 according to the fourth variant includes a P-knuckle assembly 258 and a cage assembly 260 which are held with one another on a rotary bearing to be rotatable about a P axis. In order to detect an angle of rotation C between the cage assembly 260 and P-knuckle assembly 258, a drag pointer 276 is provided in the fourth variant. The drag pointer 276 has a bearing ring 282 which runs concentrically around the P axis and is rotatably mounted on the P-knuckle assembly 258 by a friction bearing. The friction bearing allows a rotation of the bearing ring 282 relative to the P-knuckle assembly 258 about the P axis if a predetermined friction force is overcome. The predetermined friction force is sufficiently large to prevent an unintended, automatic rotation of the bearing ring 282 when exposed to vibrations, such as for instance during riding, but is sufficiently small not to impede the operational pivoting movement between the P-knuckle assembly 258 and cage assembly 260 when the drag pointer 276 is carried along by the cage assembly 260.

The drag pointer 276 also has a first projection 284 which protrudes towards the cage assembly 260, in particular protrudes from the bearing ring 282 approximately in the axial direction with respect to the P axis towards the cage assembly 260. This first projection 284 is configured to be contacted by a second projection 286 which is provided on the cage assembly 260. During a rotation of the cage assembly 260 about the P axis, the second projection 286 can thus contact the first projection 284 and carry it along in the circumferential direction about the P axis, with the result that the drag pointer 276 is rotated about the P axis while overcoming the predetermined friction force.

The drag pointer 276 preferably further includes a first marking 288. In the exemplary embodiment, the first marking 288 is configured as a projection which protrudes from the bearing ring 282 substantially parallel to the P axis in the direction of the P-knuckle assembly 258. In particular, the projections 288 and 284 can protrude in opposite directions with respect to the P axis from the bearing ring 282. Moreover, both projections 288, 284 can be provided at the same circumferential position of the bearing ring 282, as is illustrated in FIG. 7.

On the P-knuckle assembly 258 there is preferably further provided a second marking 290 by which a relative position between the drag pointer 276 and P-knuckle assembly 258 can be indicated. In the exemplary embodiment, the second marking 290 is formed by an indentation or depression, with the result that the projection 288 of the drag pointer 276 can sweep over the second marking 290 unhindered. Just like in the preceding exemplary embodiments it is possible for the first and second markings 288, 290 to be configured in such a way that an overlapping or alignment of both markings with one another indicates a predetermined correct angle C, or correct range of angle C corresponding to the width of the mark 290 in the circumferential direction, or a predetermined setpoint or setpoint range for the chain gap CG. The markings 288, 290 are preferably arranged on a side of the P-knuckle assembly 258 or of the cage assembly 260 that is at the front in the direction of travel V, with the result that they can be comfortably read by a user.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A derailleur for a bicycle, comprising:
   a B-knuckle assembly configured to be mounted on a bicycle frame;
   a P-knuckle assembly;
   a parallelogram assembly via which the B-knuckle assembly and the P-knuckle assembly are movably connected to one another;
   a cage assembly in which a chain guide pulley and a chain tension pulley are rotatably held, the cage assembly is mounted on the P-knuckle assembly so as to be rotatable about a P axis; and a rotation angle detection device configured to at least one of detect and display an angle of rotation between the P-knuckle assembly and the cage assembly, wherein the rotation angle detection device has at least a first marking which is provided on at least one of the P-knuckle assembly and the cage assembly.

2. The derailleur of claim 1, wherein the rotation angle detection device has a first marking provided on the P-knuckle assembly, and has a second marking provided on the cage assembly.

3. The derailleur of claim 2, wherein at least one of the first marking and the second marking is formed by at least one of:
- a sticker, an imprint, a shaped element, a marking produced by a laser, a change in color of material of the P-knuckle assembly or of the cage assembly, and an additionally mounted structural part.

4. The derailleur of claim 1, wherein the rotation angle detection device has a drag pointer which indicates a maximum angle of rotation between the P-knuckle assembly and the cage assembly.

5. The derailleur of claim 4, wherein the drag pointer is rotatably mounted on the P-knuckle assembly, and in that the cage assembly has a projection which is configured to carry along the drag pointer during a rotational movement of the cage assembly about the P axis.

6. The derailleur of claim 4, wherein the drag pointer is mounted on at least one of the P-knuckle assembly and the cage assembly by a friction bearing with predetermined friction force to be rotatable about the P axis, and at least one of the P-knuckle assembly and the cage assembly has a driving element, in particular a projection, which is configured to carry along the drag pointer during a rotational movement between the cage assembly and the P-knuckle assembly.

7. The derailleur of claim 4, wherein the drag pointer is formed as a ring which is concentric to the P axis.

8. The derailleur of claim 1, wherein the B-knuckle assembly is configured to be mounted on at least one of the bicycle frame and a derailleur hanger to be pivotable about a B axis, wherein the B axis runs coaxially to a rear wheel axis of the bicycle.

* * * * *